Figure 1:
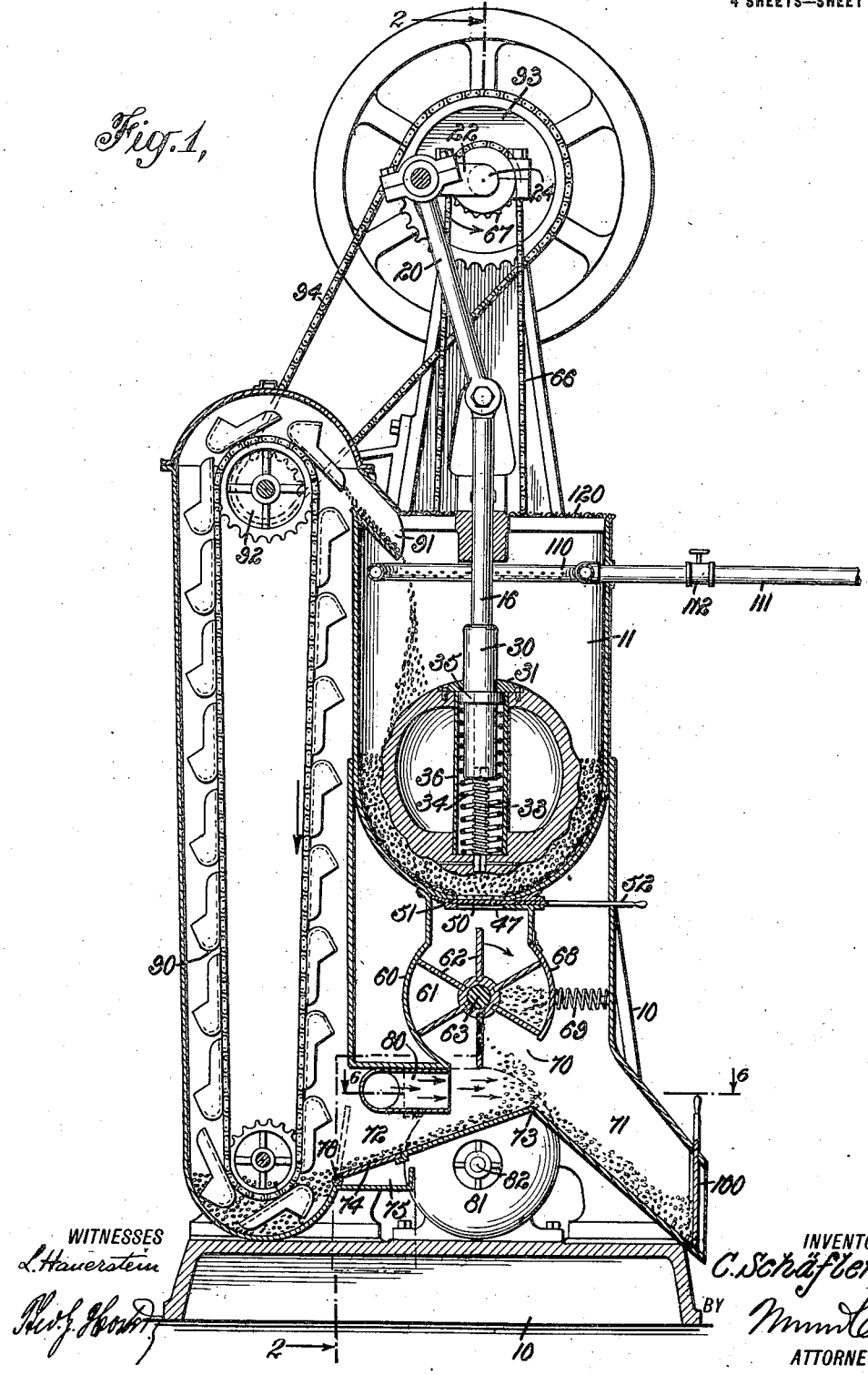

C. SCHÄFLER.
HULLING MACHINE.
APPLICATION FILED JUNE 16, 1916.

1,212,113.

Patented Jan. 9, 1917.
4 SHEETS—SHEET 1.

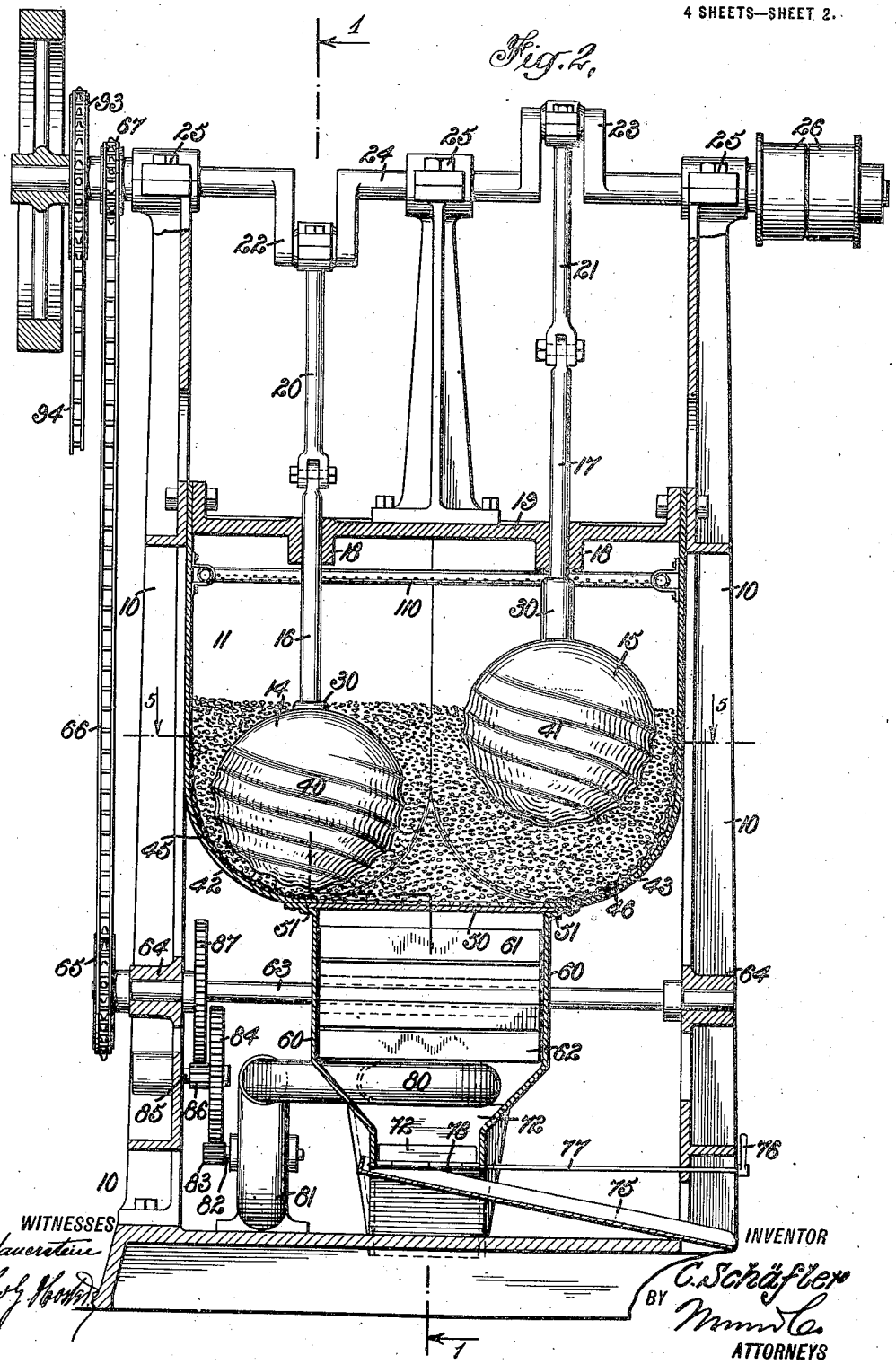

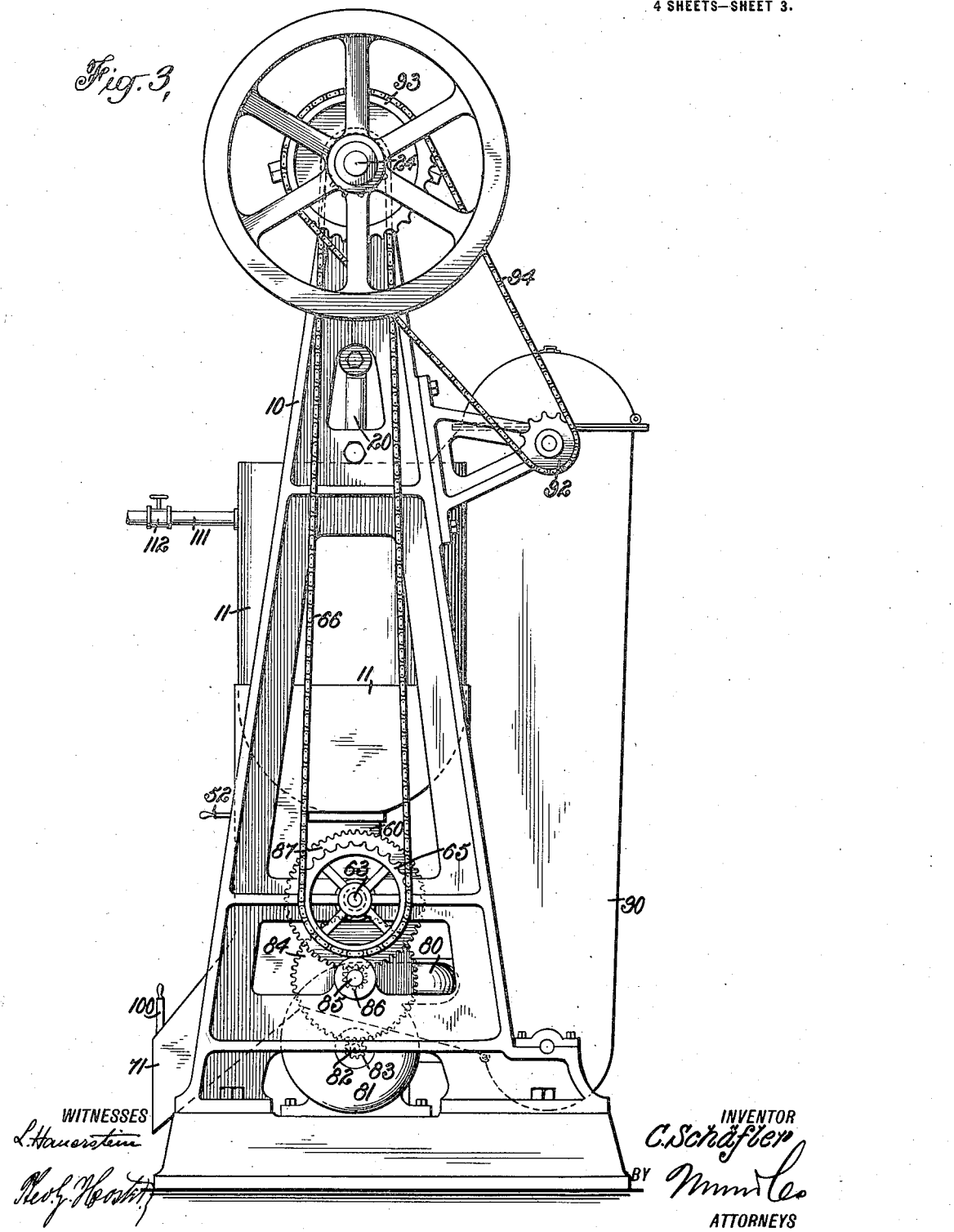

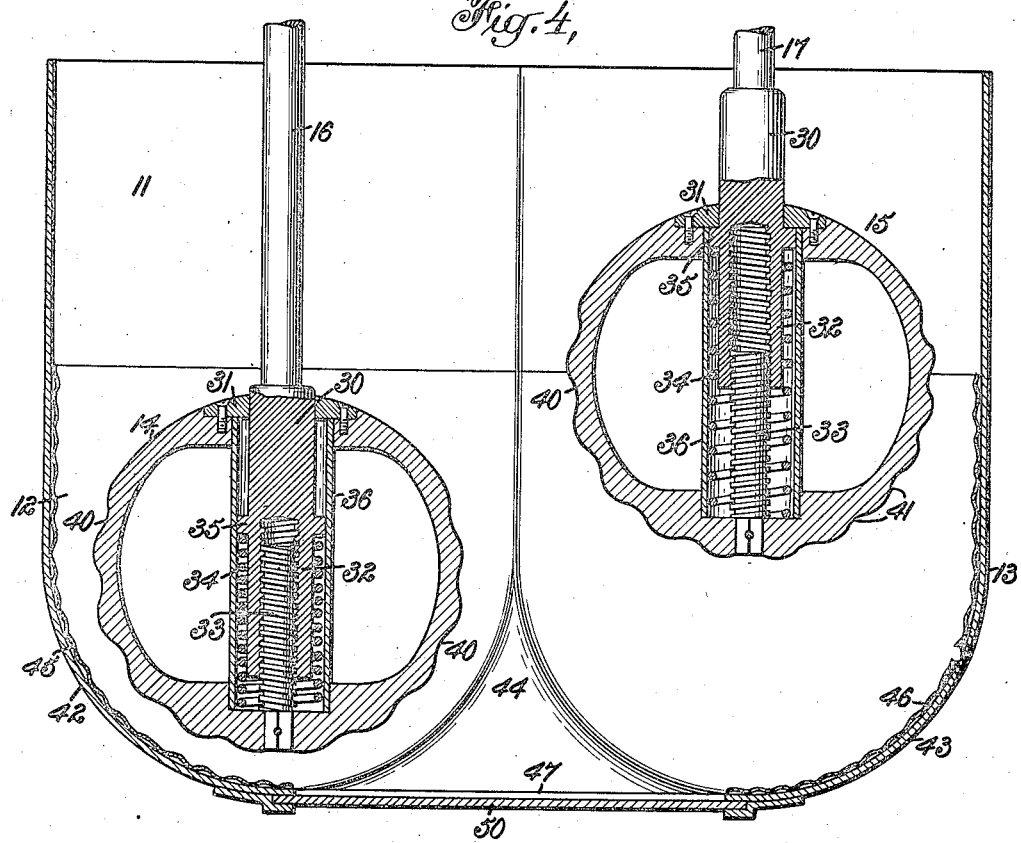
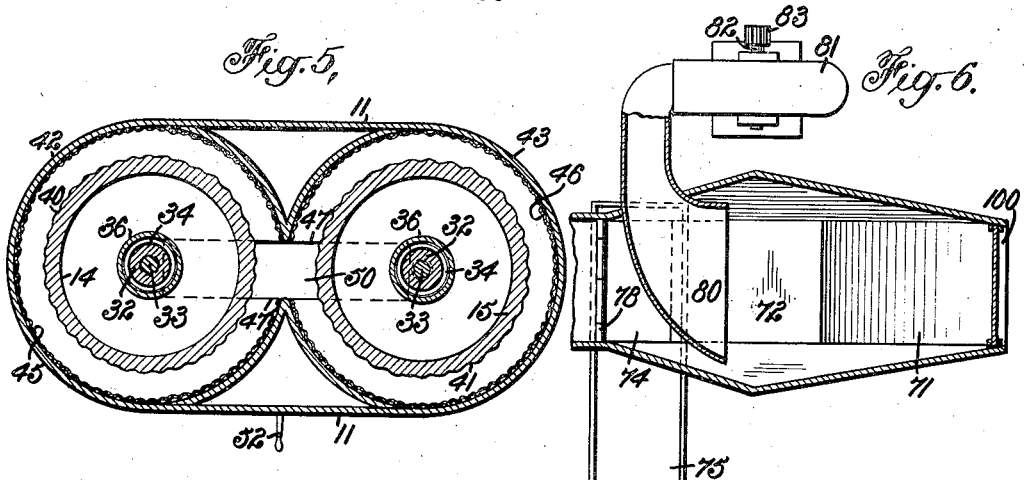

UNITED STATES PATENT OFFICE.

CARLOS SCHÄFLER, OF MERIDA, MEXICO.

HULLING-MACHINE.

1,212,113.  Specification of Letters Patent.  Patented Jan. 9, 1917.

Application filed June 16, 1916. Serial No. 103,986.

*To all whom it may concern:*

Be it known that I, CARLOS SCHÄFLER, a subject of the Emperor of Austria-Hungary, residing in Merida, Yucatan, Mexico, have invented a new and Improved Hulling-Machine, of which the following is a full, clear, and exact description.

The object of the invention is to provide a new and improved hulling machine more especially designed for hulling cereals such as maize or Indian corn without danger of breaking or crushing the grains thus rendering the hulled grains especially serviceable for the making of tortilla or arepa.

In order to accomplish the desired result use is made of a vessel adapted to contain the cereal to be hulled, the vessel having a hemispherical bottom and a spherical plunger within the vessel and having both an up and down and a turning motion in both directions to produce a rubbing action of the kernels against each other and against the vessel and plunger surfaces to separate the hulls from the corn.

A practical embodiment of the invention is represented in the accompanying drawings forming a part of this specification, in which similar characters of reference indicate corresponding parts in all the views.

Figure 1 is a sectional side elevation of the hulling machine on the line 1—1 of Fig. 2; Fig. 2 is a cross section of the same on the line 2—2 of Fig. 1; Fig. 3 is a side elevation of the same; Fig. 4 is an enlarged sectional elevation of the vessel and the plunger therein; Fig. 5 is a sectional plan view of the same on the line 5—5 of Fig. 2; and Fig. 6 is a sectional plan view of the bottom portion of the hulling machine, the section being on the line 6—6 of Fig. 1.

In hulling maize or Indian corn for making tortilla or arepa, it has been the practice to soak the maize in lime water with a view to loosen the hull, and when this has been accomplished the kernels are rubbed against each other to remove the hull from the grain. In applicant's machine presently to be described in detail the hulling is accomplished mechanically without the use of lime water and without crushing or breaking the grains so that the same are in proper condition for making tortilla or arepa.

The machine is mounted on a suitably constructed frame 10 on which is fastened a vessel 11, preferably provided with two hemispherical bottom portions 12 and 13 in which operate the plungers 14 and 15 held on stems 16, 17, mounted to slide in suitable bearings 18 arranged on a crosspiece 19 attached to the top of the vessel 11, as plainly illustrated in Fig. 2. The upper ends of the stems 16 and 17 are pivotally connected by pitmen 20 and 21 with crank arms 22, 23 of a main shaft 24 journaled in suitable bearings 25 arranged on the top of the frame 10. The shaft 24 is provided with fast and loose pulleys 26 connected by belt with other machinery for imparting a rotary motion to the shaft 24. When the machine is running and the shaft 24 is rotating then an up and down reciprocating motion is given to the stems 16 and 17 and consequently to the plungers 14 and 15 held on the said stems.

The plungers 14 and 15 are spherical in shape and are mounted to rotate on the lower ends of the stems 16 and 17, and for this purpose the following arrangement is made, it being understood that the construction of both plungers is alike so that it suffices to describe but one in detail: The lower end 30 of each stem 16 and 17 is mounted to slide up and down in a bearing 31 attached to the top of the plunger 14 or 15, and this lower end 30 is provided with a nut 32 in which screws a screw rod 33 attached at its lower end to the bottom of the plunger 14 or 15. Around the nut 32 is coiled a spring 34 resting with its lower end on the bottom of the plunger 14 or 15 and pressing with its upper end against a collar 35 formed on the stem portion 30. The spring 34 is preferably incased in a tubular casing 36 held in the plunger 14 or 15, and in which the collar 35 is mounted to slide. The collar 35 is adapted to abut against the under side of the bearing 31 to limit the upward sliding movement of the lower portion 30 of the stem 16 or 17 relatively to the plunger 14 or 15. By reference to Fig. 4 it will be noticed that the threads of the screw rod 33 of the plunger 14 extend in a reverse direction to the threads of the screw rod 33 of the plunger 15. When the plunger 14 or 15 is in uppermost position, its spring 34 holds the plunger 14 or 15 in lowermost position on the stem portion 30, and when the plunger moves downward and in contact with the maize or other cereal in the vessel 11 then the resistance offered by this cereal causes the plunger to slide upward on the stem portion 30, and in doing so the screw rod 33 screwing in the nut 32 revolves the plunger in one direction. It will also be noticed that during this sliding and turning movement of the plunger the spring 34 is pressed and when the plunger is on the return stroke the resistance of the maize gradually diminishes and consequently the spring 34 causes the plunger to slide downward on the stem portion 30 whereby the screw rod 33 unscrews in the nut 32 and then turns the plunger 14 or 15 to rotate in one direction. By having the threads of the screw rod 33 of the two plungers 14 and 15 arranged in opposite directions and as shown in Fig. 4 and as above mentioned, it is evident that the plungers always rotate in opposite directions, one relatively to the other.

The exterior surfaces of the plungers 14 and 15 are provided with corrugations 40 and 41, preferably arranged spirally as plainly indicated in Fig. 2. The lower end of the vessel 11 is provided with two spherical bottom portions 42 and 43 in communication with each other at adjacent sides by a passage 44 so that the kernels from one hemispherical bottom portion can pass into the other. The bottom portions 42 and 43 are provided with interior linings 45 and 46 of corrugated sheet metal so as to provide rough surfaces for the kernels. The plungers 14 and 15 are arranged relatively to the hemispherical bottom portions 42 and 43 so that the exterior surfaces of the plungers are spaced from the linings 45, 46 even when the plungers are in lowermost positions, as will be readily understood by reference to Figs. 2 and 4. The horizontal portion of the bottom of the vessel 11 is provided with an outlet opening 47 extending approximately from the middle of one bottom portion 42 to the middle of the other bottom portion 43, and this outlet opening 47 is adapted to be closed by a valve 50 mounted to slide in suitable bearings 51 arranged on the under side of the vessel 11. The valve 50 is provided with a handle 52 extending to one side of the machine (see Fig. 1) to permit the operator to open the valve 50 whenever it is desired to do so and as hereinafter more fully explained. The opening 47 leads to a receiving casing 60 in which is mounted to revolve a wheel 61 having wings 62 and being secured on a shaft 63 journaled in suitable bearings 64 arranged on the main frame 10. One end of the shaft 63 is provided with a sprocket wheel 65 connected by a sprocket chain 66 to a sprocket wheel 67 secured to the main shaft 24 so that when the latter is rotated a rotary motion is given to the shaft 63 and the wheel 61.

The casing 60 is provided at the discharge side with a hinged door 68 normally held closed by a spring 69 but adapted to yield in an outward direction in case the grains and hulls passing into the wheel and being carried downward by the same exert pressure against the door 68. The lower end of the casing 60 is provided with an opening 70 which leads to chutes 71 and 72 having a common apex located to one side of the vertical center of the wheels 60 and 61. Within the chute 72 is arranged the discharge nozzle 80 of a blower 81, of any approved construction and mounted on the face of the main frame 10 (see Figs. 1, 2 and 3). The shaft 82 of the blower 81 is provided with a pinion 83 in mesh with a gear wheel 84 mounted on a stud 85 attached to the main frame 10. On one face of the gear wheel 84 is secured a pinion 86 in mesh with a gear wheel 87 secured on the shaft 63 so that when the latter is rotated as previously mentioned then a rotary motion is transmitted by the gearing described to the wheel of the blower 81 to cause a blast of air to pass into the chute 72 and across the apex 73 thereof with a view to separate the hulls from the grains, the hulls passing down the chute 71 and the grains passing down the chute 72. The lower end of the chute 72 is provided at the bottom with a door 74 which when open directs the kernels into a chute 75 which leads to one side of the machine. The door 72 is controlled by the operator manipulating a suitable handle 76 held on the pintle 77 of the door hinge 78 to allow of opening the door whenever it is desired to discharge the finished grains from the machine. The door 74 is, however, kept closed after the machine is running to direct the grains into an elevator 90 of any approved construction and preferably, however, of the bucket type, provided at its upper end with a discharge chute 91 discharging into the upper end of the vessel 11 thus returning the kernels to the said vessel for another rubbing action until the kernels are completely cleaned of their hulls. The elevator 90 is driven by suitable sprocket wheels 92, 93 and a sprocket chain 94 from the main shaft 24 so that the elevator 90 is running during the time the machine is running. The lower end of the chute 71 for the hulls is provided with a suitable gate 100 normally closed and adapted to be opened periodically to discharge the accumulated hulls from the machine.

In order to facilitate the loosening of the hulls it is desirable to moisten the maize, and for this purpose use is made of a perforated ring-shaped pipe 110 arranged in the upper end of the vessel 11 and connected by a pipe 111 with a suitable source of water supply. The pipe 111 is provided with a suitable valve 112 which when open permits the water to pass into the perforated pipe 110 so that jets of water pass into the vessel 11 to moisten the maize contained therein. The top of the vessel 11 is preferably provided with a removable cover 120 in the form of an open mesh fabric and when removed permits of charging the vessel 11 with the maize to be hulled.

The operation is as follows: When the vessel 11 is charged with the maize and the main shaft 24 rotates, then an up and down movement is given to the plungers 14 and 15 and the latter are simultaneously rotated in the manner above described. During the first five minutes or so the valve 50 is kept closed and occasionally the valve 112 to moisten the cereal contained in the vessel 11. It will be noticed that by the up and down and rotating motion of the plungers 14, 15 the kernels are set in motion within the bottom portions 42, 43 of the vessel and the said kernels are caused to rub against each other and against the corrugated linings 45, 46 and the exterior surfaces of the plungers so that the hulls are gradually detached from the grains, the operation being facilitated by the supplied moisture. It will be noticed that by the peculiar rotation given to the plungers and the spiral corrugations 40 and 41 the kernels are caused to travel in various directions from one bottom portion 42 or 43 into the other to insure a complete separation of the hulls from the grains and without danger of the grains being crushed or broken. It will be noticed that during the down stroke of the plunger 14 or 15, the plunger rotates gradually slower until the end of the down stroke is reached, and during the return stroke the rotation of the plunger gradually increases in speed until the uppermost position is reached. It will also be noticed that during this gradual reduction in the rotation of the down stroke of the plungers the force thereof is increased and consequently more pressure is exerted against the kernels to insure complete separation of the hulls from the grains. It will further be noticed that by providing the spiral corrugations 40 and 41 on the plungers 14 and 15, the latter tend to push the kernels upward to prevent crushing or breaking thereof. The corrugations 40 and 41 may be roughened to facilitate the hulling. By arranging the lower end of the vessel 11 in the manner described there are no dormant places and consequently all the maize is subjected to a thorough rubbing action to insure the separation of the hull from the grain. After the machine has been running about five minutes the gate 50 is opened to allow some of the kernels to pass into the receiving casing 60 in which the wheel 61 rotates slowly to gradually feed the kernels into the upper end of the discharge chute 71 or 72 in which the hulls are separated from the grains, the hulls passing into the chute 71 and the grains sliding down the chute 72 and into the elevator 90 to be elevated and returned to the vessel 11. The above operation is kept up until the grains and hulls are completely separated together with the hilum of each grain, and when this stage is reached the operator swings the door 74 to allow the hulled grains to drop into the chute 75 to be discharged at one side of the machine. When the batch has all been run out the vessel 11 can be recharged with maize to be hulled, when the above described operation is repeated.

It is understood that in making tortilla or arepa it is necessary that the maize be completely freed from the hull and hilum and that the grain remains in wholly unbroken condition. The grain, as is well known, is cooked in water and left in water until it is completely saturated and then the grain is reduced and formed into a dough which is divided into small cakes and baked to form tortilla or arepa. If the grains were crushed prior to cooking only the formation of a paste would be the result, hence it is absolutely necessary that all crushing or breaking during the hulling operation is avoided. This result is achieved by the use of the machine above described.

Having thus described my invention, I claim as new and desire to secure by Letters Patent:

1. In a hulling machine, a vessel adapted to contain the cereal to be hulled and a plunger, means for moving the plunger up and down in the said vessel, and means for turning the plunger alternately in opposite directions.

2. In a hulling machine, a vessel having a hemispherical bottom and adapted to contain the cereal to be hulled and a spherical plunger within the said vessel and having an up and down and an alternate turning motion in opposite directions.

3. In a hulling machine, a vessel having a hemispherical bottom and adapted to contain the cereal to be hulled, a spherical plunger in the said vessel and spaced from the inner surface of the vessel, means for moving the plunger up and down, and means for turning the plunger alternately in opposite directions.

4. In a hulling machine, a vessel having a hemispherical bottom and adapted to contain the cereal to be hulled, a spherical plunger in the said vessel and spaced from the inner surface of the vessel, the said vessel bottom and the exterior surface of the plunger being corrugated, means for moving the plunger up and down, and means for turning the plunger alternately in opposite directions.

5. In a hulling machine, a vessel having a hemispherical bottom and adapted to contain the cereal to be hulled, a spherical plunger in the said vessel and spaced from the inner surface of the vessel, the said vessel bottom being provided with a corrugated lining and the exterior surface of the said plunger being provided with spiral corrugations, means for moving the plunger up and down, and means for turning the plunger alternately in opposite directions.

6. In a hulling machine, a vessel having two hemispherical bottom portions in connection with each other at adjacent sides, spherical plungers in the said vessel and each spaced from a corresponding bottom portion of the vessel, means for moving the said plungers alternately up and down in the said vessel, and means for alternately turning the plungers in opposite directions.

7. In a hulling machine, a vessel having two hemispherical bottom portions in communication with each other at adjacent sides, spherical plungers in the said vessel and each spaced from a corresponding bottom portion of the vessel, means for moving the said plungers alternately up and down in the said vessel, and means for alternately turning the plungers in opposite directions, the turning motion of one plunger while ascending being in a reverse direction to the turning motion of the descending plunger.

8. In a hulling machine, a vessel adapted to contain the cereal to be hulled and a plunger, means for moving the plunger up and down in the said vessel, means for turning the plunger alternately in opposite directions, and means for spraying the cereal in the vessel with water.

9. In a hulling machine, a vessel having two hemispherical bottom portions in communication with each other at adjacent sides, spherical plungers in the said vessel and each spaced from the corresponding bottom portion of the vessel, means for moving the said plungers alternately up and down in the said vessel, means for alternately turning the plungers in opposite directions, and a perforate water supply pipe arranged in the upper portion of the vessel for spraying the cereal in the vessel with water.

10. In a hulling machine, a vessel having a hemispherical bottom and adapted to contain the cereal to be hulled, a spherical plunger in the said vessel and spaced from the inner surface of the vessel, means for moving the plunger up and down, means for turning the plunger alternately in opposite directions, a door in the bottom of the vessel, a revoluble receiver below the said door for receiving the separated kernels and hulls, means for separating the kernels and hulls, and means for returning the kernels to the vessel.

11. In a hulling machine, a vessed adapted to contain the cereal to be hulled, a water spraying means in the upper portion of the said vessel for spraying the cereal with water, a plunger within the vessel, means for moving the plunger up and down and simultaneously imparting a turning motion to the plunger, and a revoluble receiver below the vessel for receiving the kernels and hulls from the said receiver and means for separating the kernels and hulls.

12. In a hulling machine, a plunger of spherical shape and provided exteriorly with a continuous spirally disposed corrugation.

13. In a hulling machine, a vessel having a hemispherical bottom, a spherical plunger within the said vessel and provided with a plunger stem on which the plunger is mounted to rotate, actuating means connected with the said stem for moving the plunger up and down, and means within the plunger and connected with the said stem for alternately turning the plunger in opposite directions.

14. In a hulling machine, a vessel having a hemispherical bottom, a spherical plunger within the said vessel and provided with a plunger stem on which the plunger is mounted to rotate, actuating means connected with the said stem for moving the plunger up and down, and means within the plunger and connected with the said stem for turning the plunger in one direction while descending and turning it in an opposite direction while ascending.

15. In a hulling machine, a vessel adapted to contain a cereal to be hulled, a plunger in the said vessel, a plunger stem on which the said plunger is mounted to turn, the said stem having a nut, a screw rod fixed in the plunger and screwing in the said nut, a spring interposed between the plunger and the stem, and means for imparting a reciprocating motion to the said plunger stem.

16. In a hulling machine, a vessel for holding the cereal to be hulled, a plunger in the said vessel including a stem and a head at the lower end of the stem, means for moving the plunger up and down, and means for simultaneously rotating the said plunger head including relatively engaging means carried by the head and the said stem.

17. In a hulling machine a vessel adapted to contain the cereal to be hulled and having an outlet at the bottom, means for hulling the cereal, a revoluble receiver below the vessel and having compartments for receiving the kernels and hulls from said vessel, and discharging the same, as the receiver revolves, a double chute below the revoluble receiver and having a common apex located to one side of the vertical center of the revoluble receiver, and means for producing an air blast between said revoluble receiver and the said chute to separate the hulls from the kernels and to separately discharge the hulls and kernels.

CARLOS SCHÄFLER.